(12) United States Patent
Yang

(10) Patent No.: US 11,685,416 B2
(45) Date of Patent: *Jun. 27, 2023

(54) FOLDABLE WAGON

(71) Applicant: Zhejiang Hengfeng Top Leisure Co., Ltd., Zhejiang (CN)

(72) Inventor: Baoqing Yang, HangZhou (CN)

(73) Assignee: Zhejiang Hengfeng Top Leisure Co., Ltd., Zhejiang (CN)

( * ) Notice: Subject to any disclaimer, the term of this patent is extended or adjusted under 35 U.S.C. 154(b) by 290 days.

This patent is subject to a terminal disclaimer.

(21) Appl. No.: 17/167,160

(22) Filed: Feb. 4, 2021

(65) Prior Publication Data

US 2021/0300450 A1    Sep. 30, 2021

Related U.S. Application Data

(63) Continuation-in-part of application No. 17/024,836, filed on Sep. 18, 2020, now Pat. No. 11,332,178.

(30) Foreign Application Priority Data

Mar. 25, 2020   (CN) .......................... 202020396371.7

(51) Int. Cl.
    *B62B 3/00*  (2006.01)
    *B62B 3/02*  (2006.01)
(52) U.S. Cl.
    CPC .............. *B62B 3/022* (2013.01); *B62B 3/002* (2013.01); *B62B 3/007* (2013.01); *B62B 2301/25* (2013.01)

(58) Field of Classification Search
    CPC ..... B62B 3/002; B62B 2205/02; B62B 3/025; B62B 2205/06; B62B 3/007; B62B 3/022; B62B 2301/25
    See application file for complete search history.

(56) References Cited

U.S. PATENT DOCUMENTS

| | | |
|---|---|---|
| 1,771,836 A | 7/1930 | Beckham |
| 1,919,103 A | 7/1933 | Dolge |
| 1,998,269 A | 4/1935 | Brown |
| 2,016,232 A | 10/1935 | Floyd |
| 2,020,766 A | 11/1935 | Brown |
| 2,036,455 A | 4/1936 | Brown |
| 2,049,683 A | 8/1936 | Baumgardner |
| 2,421,751 A | 6/1947 | Giordano |

(Continued)

FOREIGN PATENT DOCUMENTS

| | | |
|---|---|---|
| CN | 202806814 U | 3/2013 |
| CN | 206406949 U | 8/2017 |

*Primary Examiner* — James M Dolak
*Assistant Examiner* — James J Triggs
(74) *Attorney, Agent, or Firm* — Thompson Coburn LLP

(57) ABSTRACT

A foldable wagon has a frame with vertical members arranged at four corners of the frame. Each vertical member has an upper bracket, a lower bracket, and a sliding member slidingly disposed on the vertical member between the upper and lower brackets. The frame has first bottom members with inner ends pivotally connected together with a first bottom connecting member and outer ends operatively and pivotally connected to a respective sliding member. The frame has second bottom members with inner ends operatively and pivotally connected together with a second bottom connecting member and outer ends being operatively and pivotally connected to a respective lower bracket.

20 Claims, 12 Drawing Sheets

(56) References Cited

U.S. PATENT DOCUMENTS

| | | | |
|---|---|---|---|
| D177,208 S | 3/1956 | Berlin | |
| 3,945,660 A | 3/1976 | Zalewski | |
| 4,055,357 A | 10/1977 | Sorocin | |
| 4,735,426 A | 4/1988 | McConnell | |
| 5,222,748 A | 6/1993 | Johnson | |
| 5,649,718 A | 7/1997 | Groglio | |
| 5,915,723 A | 6/1999 | Austin | |
| 6,179,374 B1 | 1/2001 | Tang | |
| 6,260,566 B1 | 7/2001 | LaFave et al. | |
| 6,276,548 B1 | 8/2001 | Mitchell | |
| 6,354,619 B1 | 3/2002 | Kim | |
| 6,378,893 B1 | 4/2002 | Jager | |
| 6,438,773 B1 | 8/2002 | Hsia | |
| 6,491,318 B1 | 12/2002 | Galt et al. | |
| 6,845,991 B1 | 1/2005 | Ritucci et al. | |
| 6,929,230 B2 | 8/2005 | Tsai | |
| 7,097,182 B1 | 8/2006 | Liu | |
| 7,131,364 B2 | 11/2006 | Brazell | |
| 7,163,228 B2 | 1/2007 | Faber | |
| D551,723 S | 9/2007 | Schlegel et al. | |
| D551,724 S | 9/2007 | Seckel et al. | |
| 7,281,731 B2 | 10/2007 | Shamah | |
| 7,503,085 B2 | 3/2009 | Harrison et al. | |
| 7,547,037 B2 | 6/2009 | Poppinga et al. | |
| 7,625,033 B2 | 12/2009 | Michelau et al. | |
| 7,731,221 B2 | 6/2010 | Bess | |
| 7,770,913 B2 | 8/2010 | Cannon | |
| 8,011,686 B2 | 9/2011 | Chen et al. | |
| 8,024,825 B2 | 9/2011 | Harrison et al. | |
| 8,162,349 B1 | 4/2012 | Roselle | |
| 8,220,824 B2 | 7/2012 | Chen et al. | |
| 8,388,015 B2 | 3/2013 | Chen | |
| 8,882,135 B1 | 11/2014 | Chen | |
| 8,882,136 B2 | 11/2014 | Glaser et al. | |
| 8,973,940 B2 | 3/2015 | Chen et al. | |
| 9,056,621 B1 | 6/2015 | Jin et al. | |
| 9,073,564 B2 | 7/2015 | Yang et al. | |
| 9,082,311 B2 | 7/2015 | Franzblau | |
| 9,085,311 B1 | 7/2015 | Chen | |
| 9,101,206 B1 | 8/2015 | Chen et al. | |
| 9,108,656 B1 | 8/2015 | Nolan et al. | |
| 9,145,154 B1 | 9/2015 | Horowitz | |
| 9,211,897 B2 | 12/2015 | Fang et al. | |
| D748,739 S | 2/2016 | Horowitz | |
| 9,327,749 B2 | 5/2016 | Foung et al. | |
| 9,561,151 B2 | 2/2017 | Opsetmoen | |
| 9,580,095 B2 | 2/2017 | Vargas, II et al. | |
| 9,623,890 B1 | 4/2017 | Horowitz | |
| D794,133 S | 8/2017 | Ostergaard et al. | |
| 9,738,298 B1 * | 8/2017 | Yang | B62B 3/025 |
| 9,771,093 B2 | 9/2017 | Horowitz | |
| 9,956,981 B1 | 5/2018 | Fitzwater et al. | |
| 10,081,380 B2 | 9/2018 | Fitzwater et al. | |
| 10,099,711 B1 | 10/2018 | Sun | |
| 10,099,712 B1 | 10/2018 | Sun | |
| 10,300,933 B2 | 5/2019 | DeBry | |
| 10,300,934 B2 | 5/2019 | Ostergaard | |
| 10,392,042 B2 | 8/2019 | Fitzwater et al. | |
| 10,399,586 B1 | 9/2019 | Huang | |
| 10,633,010 B1 * | 4/2020 | Zhang | B62B 3/025 |
| D929,063 S | 8/2021 | Zhang | |
| 2003/0025301 A1 | 2/2003 | Banuelos | |
| 2007/0284900 A1 | 12/2007 | Sze | |
| 2008/0217886 A1 | 9/2008 | Poppinga et al. | |
| 2010/0090444 A1 | 4/2010 | Chen et al. | |
| 2010/0156069 A1 | 6/2010 | Chen | |
| 2011/0204598 A1 | 8/2011 | Stevenson | |
| 2015/0035258 A1 | 2/2015 | Chen et al. | |
| 2016/0347338 A1 | 12/2016 | Vargas, II et al. | |
| 2018/0057035 A1 | 3/2018 | Choi | |
| 2018/0118243 A1 | 5/2018 | Fitzwater et al. | |
| 2018/0327011 A1 | 11/2018 | Horowitz et al. | |
| 2019/0092363 A1 | 3/2019 | Ostergaard et al. | |

* cited by examiner

FOLDABLE WAGON

RELATED APPLICATION DATA

This application is a continuation in part of U.S. application Ser. No. 17/024,836 filed Sep. 18, 2020, which claims the benefit of Chinese Utility Model Application Ser. No. CN 202020396371.7, filed on Mar. 25, 2020, the disclosures of which are incorporated by reference herein.

BACKGROUND AND SUMMARY

This disclosure pertains to hand-drawn wagons. More particularly, the present disclosure pertains to a hand-drawn wagon that is collapsible in a manner such that the wagon basically has the same vertical height when in the collapsed and expanded configurations so that the volume of the wagon when in the collapsed configuration is relatively smaller in comparison to conventional foldable wagons thereby allowing the wagon to be stored in a minimal amount of space.

Figure 1:
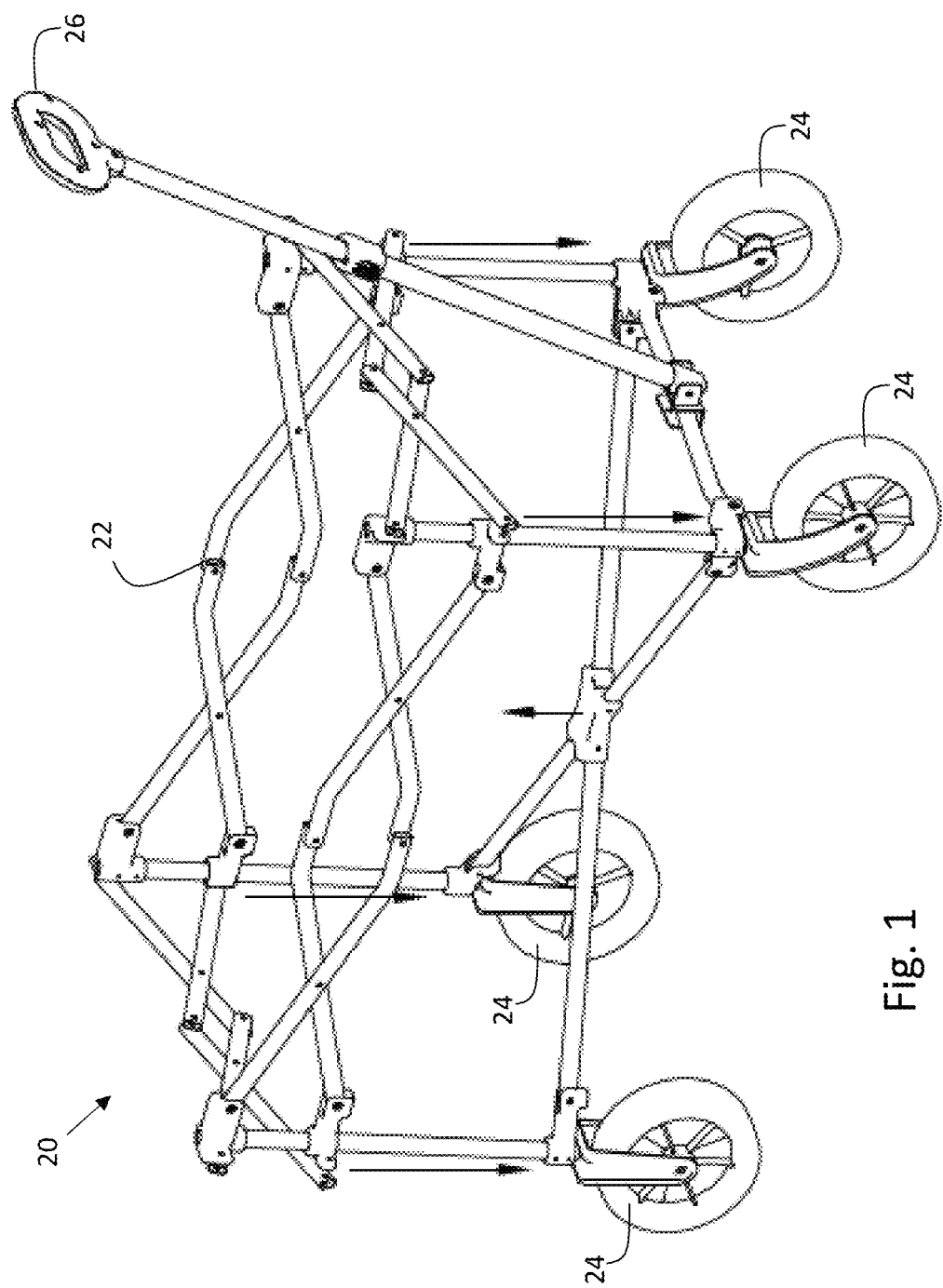
FIG. 1 is a perspective view of an exemplary wagon in its expanded configuration.
Figure 2:
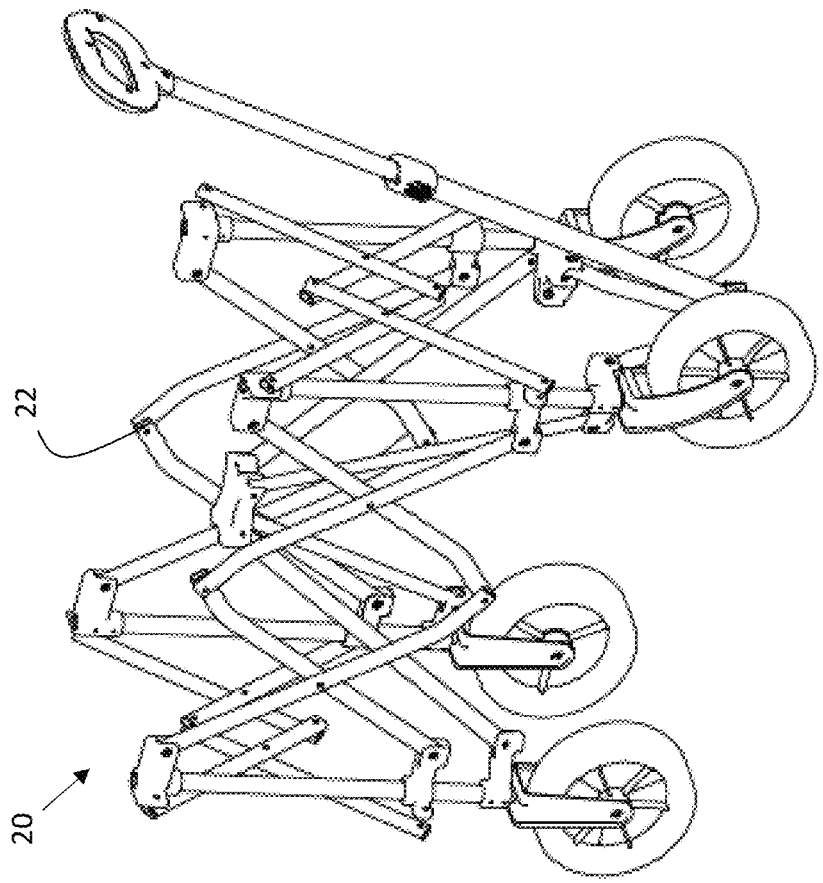
FIG. 2 is perspective view of the wagon of FIG. 1 as it is being altered from its expanded configuration to its collapsed configuration.
Figure 3:
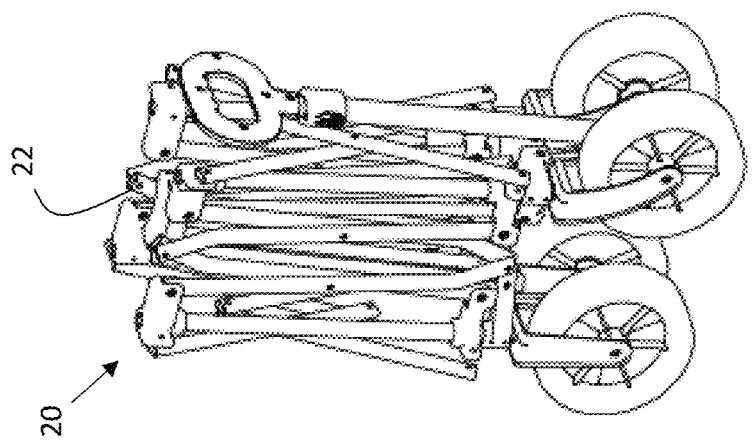
FIG. 3 is a perspective view of the wagon of FIG. 1 in its collapsed configuration.

Reference numerals in the written specification and in the drawing figures indicate corresponding items.

DETAILED DESCRIPTION

Figure 13:
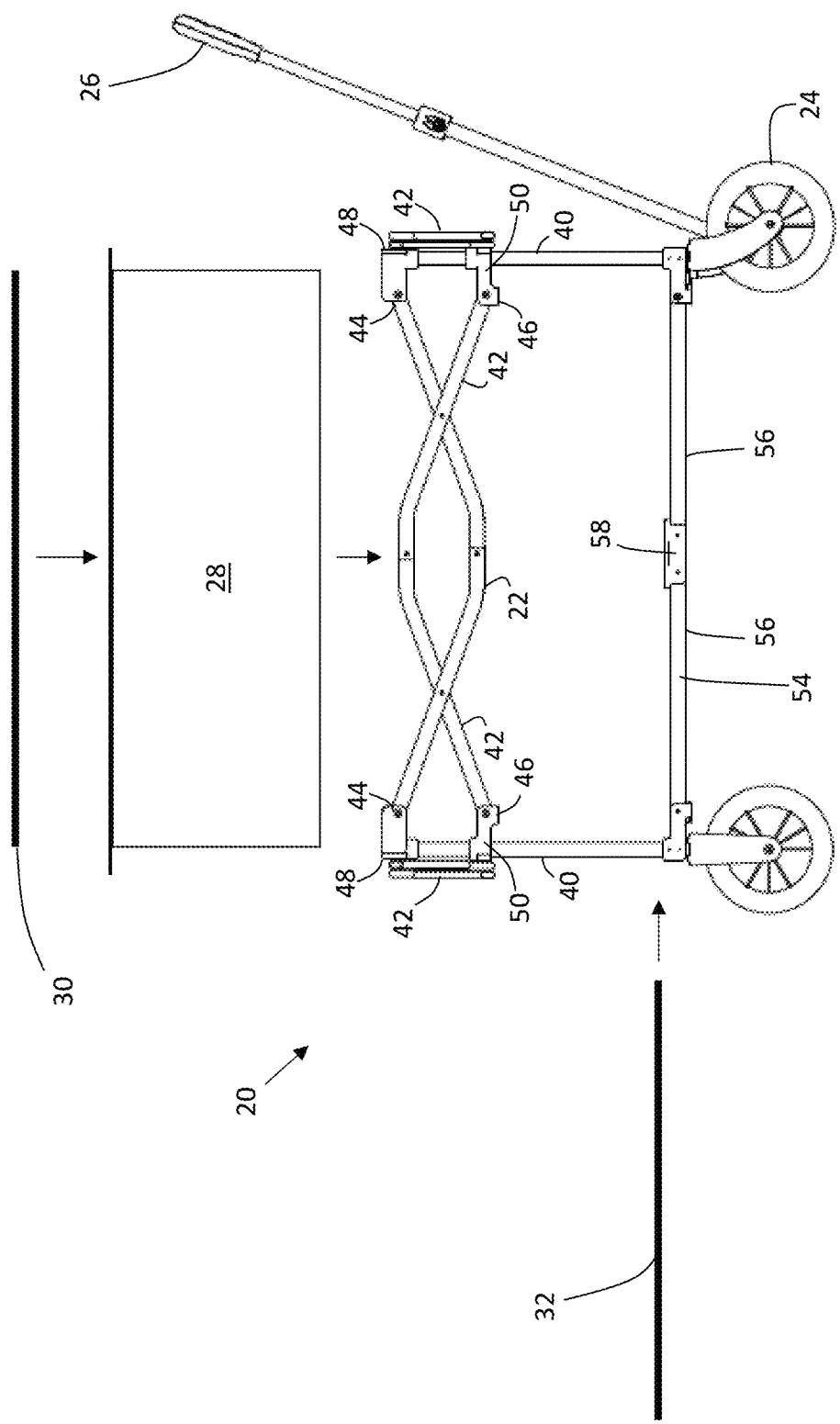
FIG. 13 is a left side view of the wagon of FIG. 1 in its expanded configuration with a liner, stiffening panel, and lower shelf shown exploded.
Figure 14:
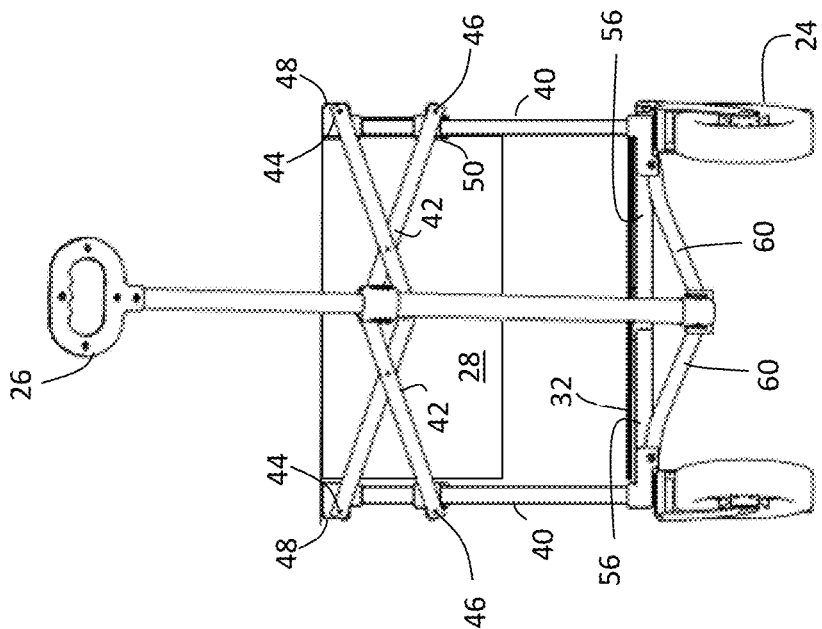
FIG. 14 is a front elevation view of the wagon of FIG. 13 with the liner, stiffening panel, and lower shelf assembled with a frame of the wagon.
Figure 15:
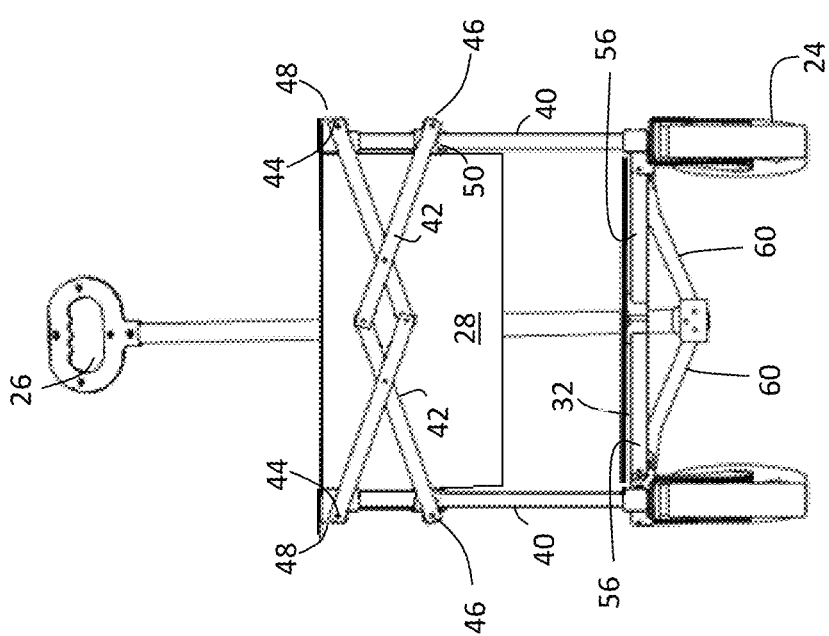
FIG. 15 is a rear elevation view of the wagon of FIG. 13 with the liner, stiffening panel, and lower shelf assembled with a frame of the wagon.
Figure 16:
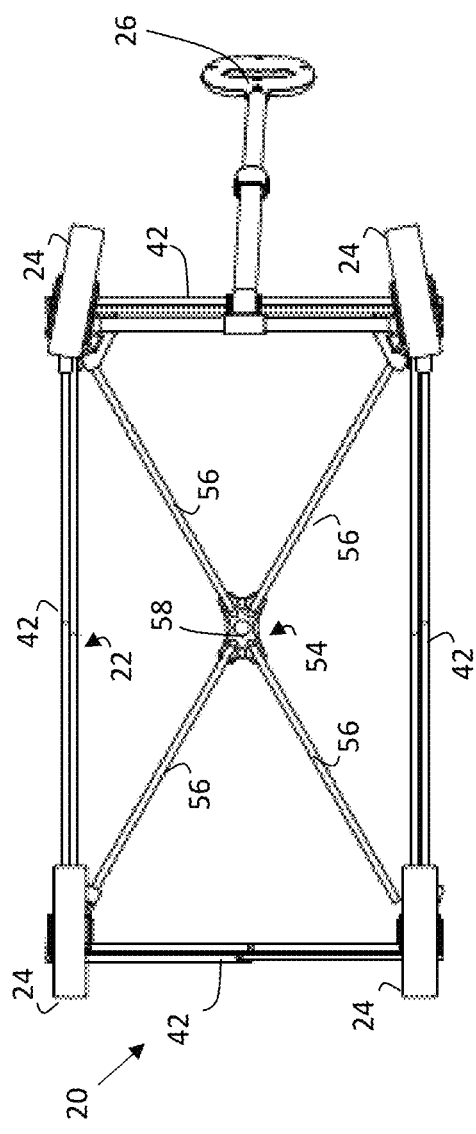
FIG. 16 is a top plan view of the wagon of FIG. 13 with the liner, stiffening panel, and lower shelf removed for ease of illustration.
Figure 17:
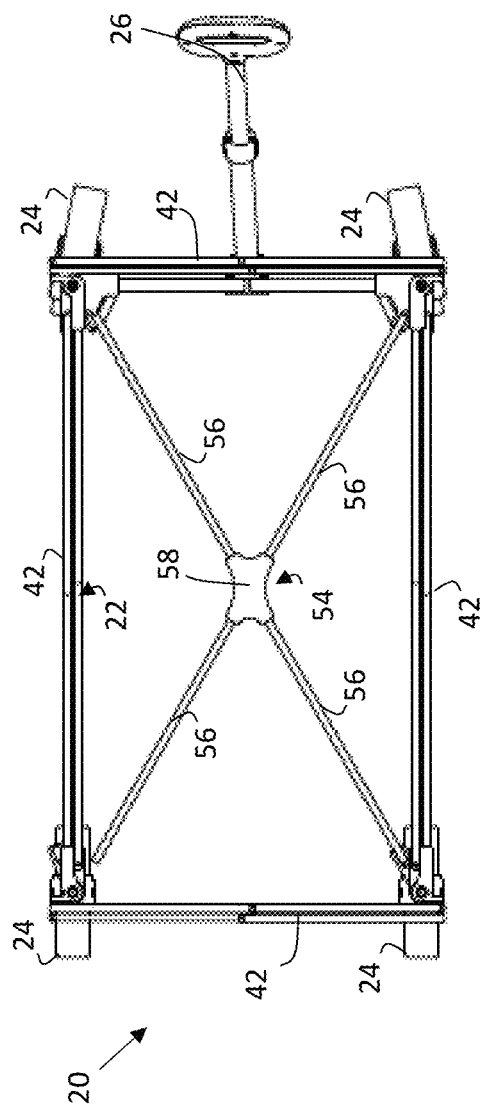
FIG. 17 is a bottom view of the wagon of FIG. 13 with the liner, stiffening panel, and lower shelf removed for ease of illustration.
Figure 18:
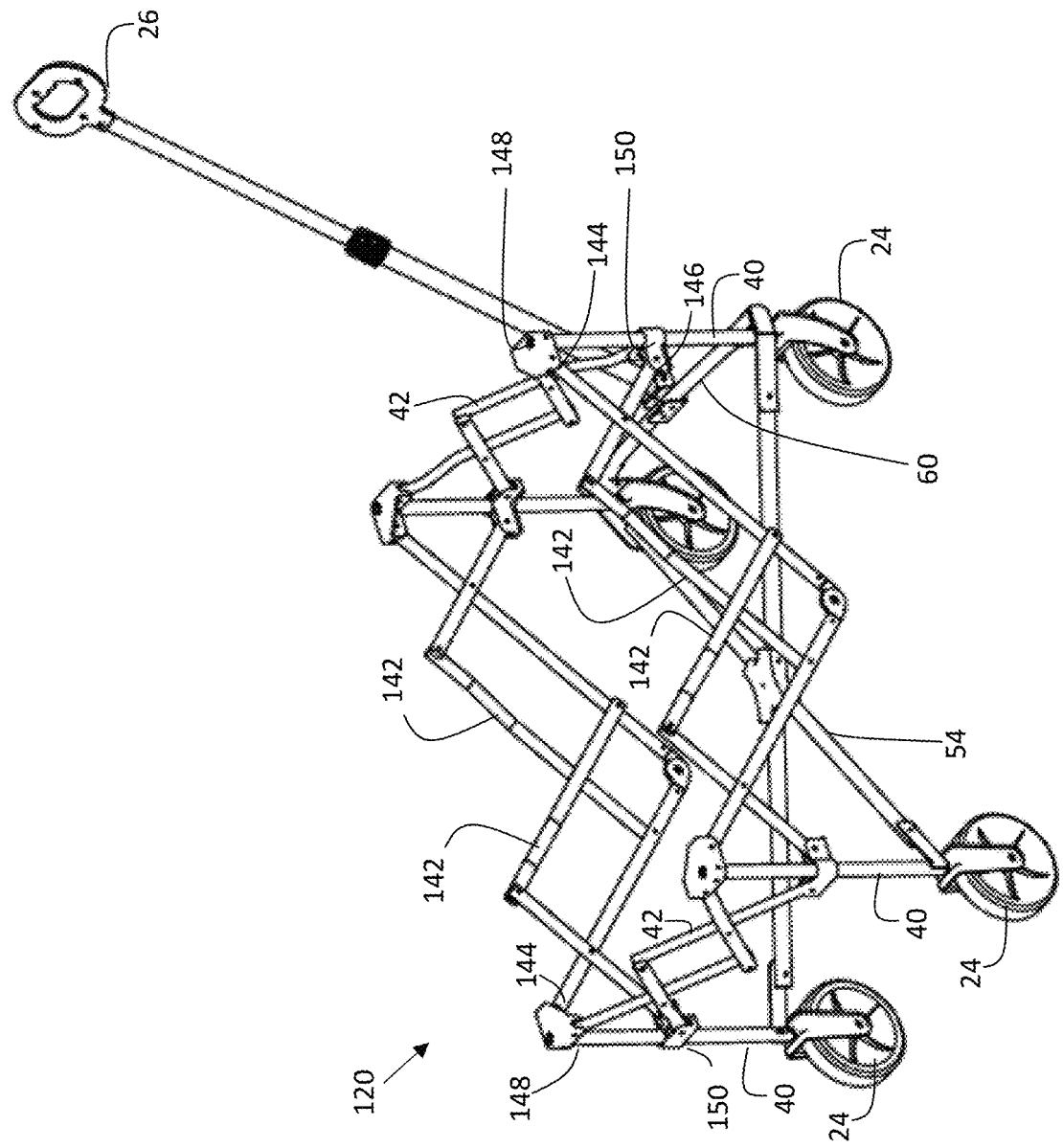
FIG. 18 is a perspective view of another embodiment of an exemplary wagon in its expanded configuration.
Figure 19:
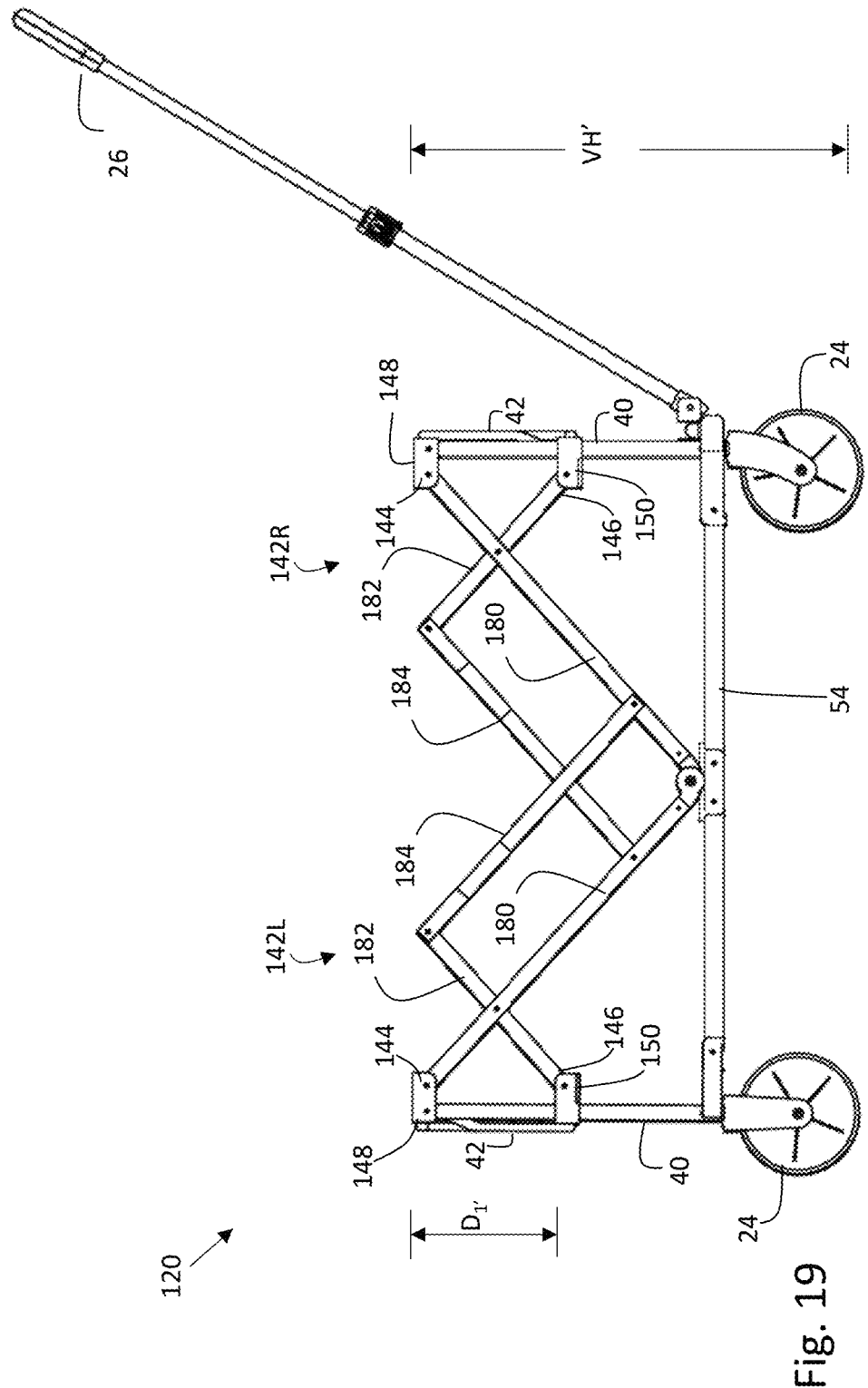
FIG. 19 is a side elevation view of the wagon of FIG. 18 in its expanded configuration.
Figure 20:
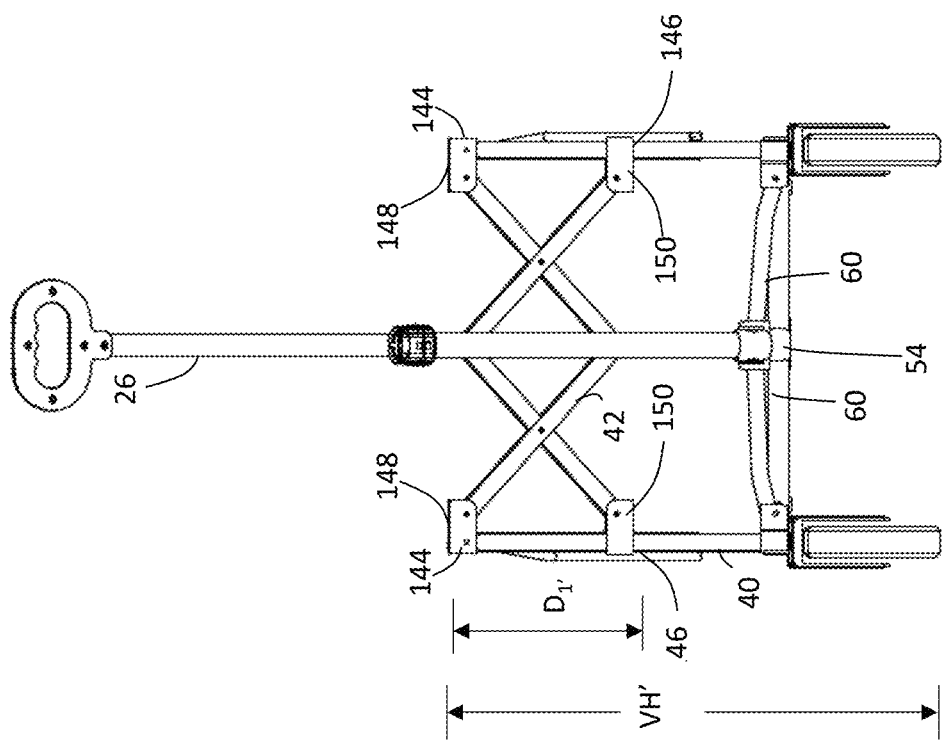
FIG. 20 is a front elevation view of the wagon of FIG. 18.
Figure 21:
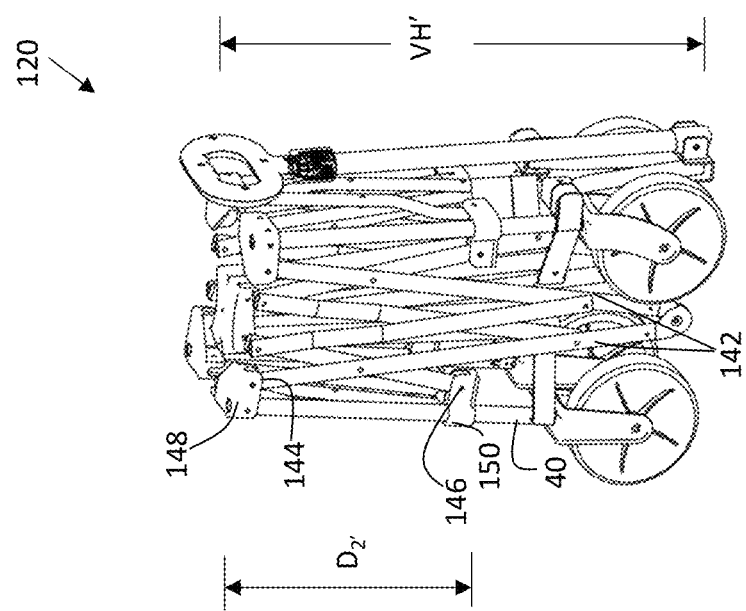
FIG. 21 is a perspective view of the wagon of FIG. 18 in its collapsed configuration.

One embodiment of a collapsible wagon 20 is shown in FIGS. 1-17. A second embodiment of a collapsible wagon 120 is shown in FIGS. 18-21. Referring to the wagon of FIGS. 1-17, the collapsible wagon 20 comprises a frame 22, a plurality of wheels 24, a tow handle 26. The collapsible wagon may include a pliable liner 28 with a stiffener panel 30, and may include a bottom shelf or container 32 that is arranged below the pliable liner (all shown FIGS. 13-15).

Figure 4:
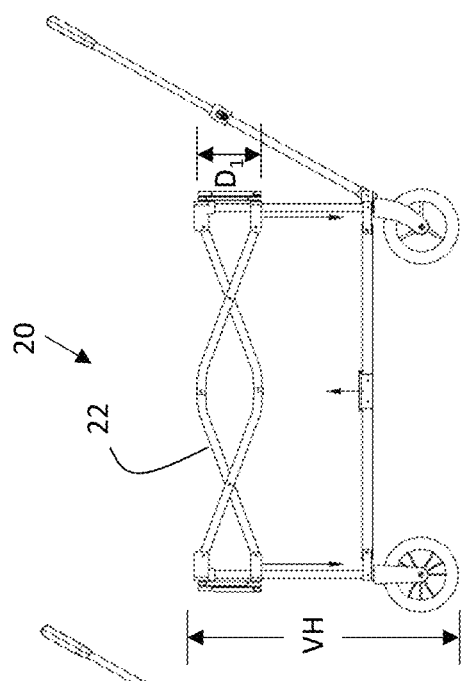
FIG. 4 is a side elevation view of the wagon of FIG. 1 in its expanded configuration.
Figure 5:
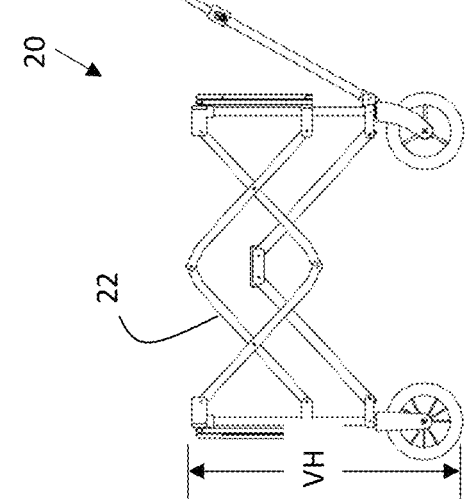
FIG. 5 is a side elevation view of the wagon of FIG. 1 as it is being altered from its expanded configuration to its collapsed configuration.
Figure 6:
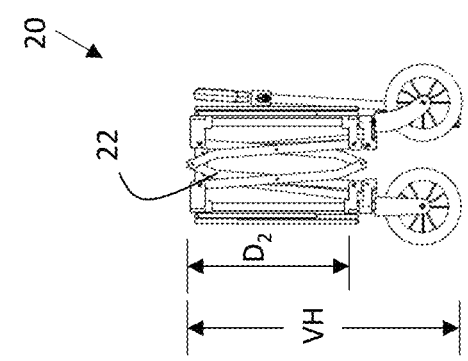
FIG. 6 is a side elevation view of the wagon of FIG. 1 in its collapsed configuration.
Figure 7:
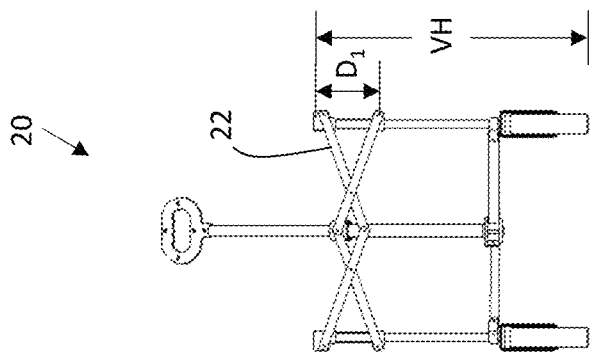
FIG. 7 is a front elevation view of the wagon of FIG. 1 in its expanded configuration.
Figure 8:
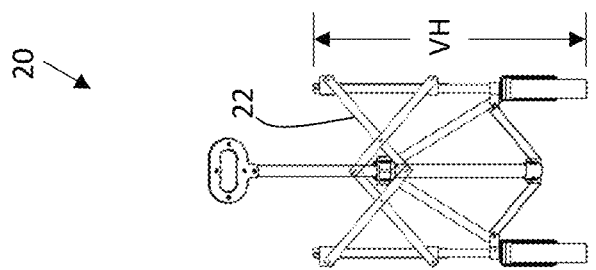
FIG. 8 is a front elevation view of the wagon of FIG. 1 as it is being altered from its expanded configuration to its collapsed configuration.
Figure 9:
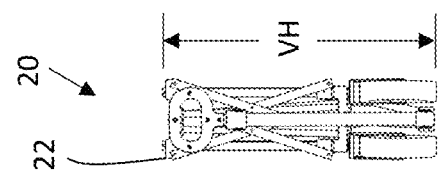
FIG. 9 is a front elevation view of the wagon of FIG. 1 in its collapsed configuration.
Figure 10:
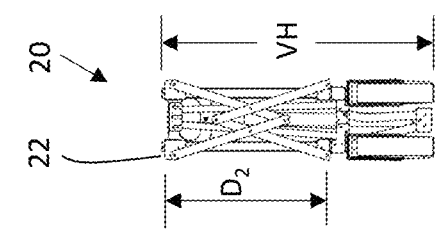
FIG. 10 is a rear elevation view of the wagon of FIG. 1 in its collapsed configuration.
Figure 11:
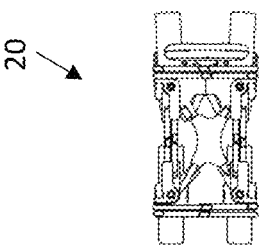
FIG. 11 is a top plan view of the wagon of FIG. 1 in its collapsed configuration.
Figure 12:
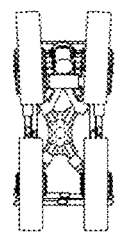
FIG. 12 is a bottom view of the wagon of FIG. 1 in its collapsed configuration.

The frame 22 of the wagon 20 is generally rectangular with a pair of folding bar assemblies 42 on each side of the frame, and four vertically oriented poles 40 at the intersection of one pair of folding bar assemblies of one side of the frame with another pair of folding bar assemblies of an adjacent, transverse side of the frame. As shown in FIGS. 1-17, the folding bar assemblies may be scissor bar assemblies whereas FIGS. 18-21 show a variation of folding bar assemblies comprising the left and right sides of the frame, as will be discussed below. Each folding bar assembly 42 of the pair of folding bar assemblies of a side of the frame preferably comprises a single pair of crossed bars that are pivotally joined to each other to form a scissor bar assembly. Each scissor bar assembly of the pair of folding bar assemblies 42 of a side of the frame 22 has left and right upper leg ends and left and right lower leg ends. To form a pair of scissor bar assemblies of the side of the frame, the right upper leg end of one scissor bar assembly is connected with left upper leg end of the other scissor bar assembly, and the right lower leg end of one scissor bar assembly is connected with the left lower leg end of the other scissor bar assembly. Thus, one scissor bar assembly is connected end to end with another scissor bar assembly to form the pair of folding bar assemblies 42 for the side of the frame. The pair of folding bar assemblies 42 of each side of the frame have opposite upper leg outer ends 44, that is, the right upper leg end of one folding bar assembly and the left upper leg end of the other folding bar assembly in the pair of folding bar assemblies of the side of the frame. The pair of folding bar assemblies 42 of each side of the frame have opposite lower leg outer ends 46, that is, the right lower leg end of one folding bar assembly and the left lower leg end of the other folding bar assembly in the pair of folding bar assemblies of the side of the frame. As is typical with most folding bar assemblies, each folding bar assembly 42 is adjustable between an expanded configuration and a collapsed configuration. The upper leg ends of each of the folding bar assemblies 42 are closer to the corresponding lower leg end when the said folding bar assembly is in the expanded configuration (as shown in FIGS. 1,4,7) as compared to the collapsed configuration (as shown in FIGS. 3, 6, 9, 10). Similarly, the upper leg ends of each of the folding bar assemblies 42 are closer to each other when the folding bar assembly is in the collapsed configuration as compared to the expanded configuration.

The upper leg outer end 44 of each of the pair of folding bar assemblies may be operatively connected to the vertically oriented pole 40. For instance, a connector 48 may be fixedly mounted on the top or distal end of the vertically oriented pole, and the upper leg outer end 44 may be connected to the connector with a pivot pin. The connector 48 may be configured to connect the vertically oriented pole 40 with both the upper leg outer end 44 of a folding bar assembly of one side of the frame and the upper leg outer end of another folding bar assembly of an adjacent transverse side of the frame. The lower leg outer end 46 of each of the pair of folding bar assemblies may be operatively slidingly connected to the vertically oriented pole 40. For instance, a sliding connector 50 may be arranged below the upper leg outer end connector 48 to slide on the vertically oriented pole 40, and the lower leg outer end 46 may be connected to the sliding connector 50 with a pivot pin. The sliding connector 50 may be configured to slidingly couple the vertically oriented pole 40 with both the lower leg outer end 46 of a folding bar assembly 42 of one side of the frame and the lower leg outer end of another folding bar assembly of an adjacent transverse side of the frame.

When the wagon 20 is in the expanded configuration, each of the lower leg outer ends 46 of the pairs of folding bar assemblies 42 has a first distance D1 to each of the corresponding upper leg outer ends 44 of the pairs of folding bar assemblies along the respective vertically oriented poles 40. The first distance D1 may be different for each upper leg and lower leg outer end but is generally preferably roughly the same. As the wagon is altered from the wagon's expanded configuration to the wagon's collapsed configuration, the lower leg outer end 46 of each of the pair of folding bar assemblies 42 slides downward (and away) relative to the corresponding upper leg outer end 44 of the pairs of folding bar assemblies on the respective vertically oriented pole 40. So, when the wagon is in the collapsed configuration, each of the lower leg outer ends 46 of the pairs of folding bar assemblies 42 is at a second distance D2 to each of the corresponding upper leg outer end 44 of the pairs of folding bar assemblies along the respective vertically oriented poles. The second distance D2 may be different for each upper leg and lower leg outer end but is generally preferably roughly the same. As the frame is altered from the expanded configuration to the collapsed configuration, the pairs of folding bar assemblies 42 increase in height and decrease in length. The second distance D2 of each of the respective upper and lower legs outer ends 44,46 is greater than the first distance D1 of each of the respective upper and lower legs outer ends. Similarly, as the wagon is altered from the wagon's collapsed configuration to the wagon's expanded configuration the lower leg outer end 46 of each of the pairs of folding bar assemblies 42 slides upward (and toward) relative to the corresponding upper leg outer end 44 of the pairs of folding bar assemblies on the respective vertically oriented pole 40. As the frame is altered from the collapsed configuration to the expanded configuration, the pairs of folding bar assemblies 42 decrease in height and increase in length. In view of the arrangement of the folding bar assemblies 42 on the sides of the frame, the sliding motion of each of the lower leg outer ends 46 on the vertically oriented pole 40, and the fixed positioning of each of the upper leg outer ends 44 on the vertically oriented pole, the frame has the same vertical height VH when the wagon is in the collapsed configuration as when the wagon is the expanded configuration. And as described below in greater detail, the telescopically arranged tow handle 26 and downward motion of the connecting bars 60 from the tow handle to the frame also allows the wagon as a whole to have the same vertical height when the wagon is in the collapsed configuration as when the wagon is the expanded configuration.

The frame 22 of the wagon 20 also preferably comprises a collapsible bottom support assembly 54. The bottom support assembly 54 preferably comprises four bars 56 that are each operatively pivotally connected to a central hub 58 and extend therefrom. Each of the four bars 56 is also pivotally connected to the frame 22 adjacent to a bottom end portion of a respective one of the vertically oriented poles 40. As the wagon 20 is collapsed, the central hub 58 moves upward. The central hub 58 is preferably configured to limit the extent to which the bars 56 can pivot relative to the central hub, such that central hub cannot be moved lower than being in plane with the bars 56 of the bottom support assembly 54 when in the expanded configuration of the frame. Thus, when the wagon 20 is in its expanded configuration, the bottom support assembly 54 is capable of supporting a downward acting load. Thus, the liner 28 need not carry the entire load of cargo placed in the wagon 20. The liner 28 may be spaced from the bottom support assembly 54, and a shelf 32 or container (not shown) may be removably mounted on the bottom support assembly 54. Because the central hub 58 is preferably configured to limit the extent to which the bars 56 can pivot relative to the central hub, such that central hub cannot be moved lower than being in plane with the bars 56 of the bottom support assembly 54 when in the expanded configuration of the frame, the shelf 32 or lower container need not carry the entire load of cargo placed in the wagon.

Each of the wheels 24 of the wagon 20 is operatively attached to the lower portion of the frame 22 adjacent to a bottom portion of the respective one of the vertically oriented poles 20. Preferably, the two wheels 24 nearest the tow handle 26 are able to pivot about vertical axes that swivel in addition to being able to rotate on their horizontal axles. The other two wheels 24 preferably do not pivot about a vertical axis (do not swivel) but rotate about their horizontal axles.

The tow handle 26 preferably comprises two telescopically attached sections. The telescoping tow handle 26 is preferably operatively connected to the lower portion of the frame adjacent two of the vertically oriented poles 20 via two connecting members 60. Each of the connecting members 60 has a first end portion that is operatively pivotally connected to the bottom end portion of the respective vertically oriented pole 40, and an opposite second end portion that is pivotally connected to the telescoping tow handle 26. Each connecting member 60 is configured to extend downward in a sloped manner from the frame adjacent to the bottom portion of the respective vertically oriented pole 40 to the telescoping tow handle 26 such that the second end portions of the connecting members move downward relative to the bottom end portions of the vertically oriented poles as the wagon 20 is collapsed. When the wagon 20 is collapsed, the telescoping tow handle 26 can also be collapsed such that it does not extend above the frame 22 of the wagon.

The pliable liner 28 of the wagon 20 rests inside the frame 22 when the wagon is expanded and forms the open-top interior compartment of the wagon. Each upper corner of the pliable liner is removably attachable to the top portion of a respective one of the vertically oriented poles 40. The pliable liner 28 may also comprise a plurality of flaps (not shown) having looped fasteners (such as Velcro®) that extend downward from the base of the pliable liner. The flaps may be used to secure the base of the pliable liner to the bars 56 and the central hub 58 of the frame 22. The pliable liner may include a pair of inverted pockets and a pliable fabric handle. The inverted pockets may be configured to receive the top-center portion of each of the side folding bar assemblies 42 for supporting the pliable liner 28 from the frame 22. The fabric handle may be configured to allow the center portion of the pliable liner 28 to be pulled upward which may in turn cause the pliable liner to pull upward on the bottom support assembly 54 of the frame 22 of the wagon 20. The pulling force moves the central hub 58 of the bottom support assembly 54 of the frame 22 upward and collapses the wagon 20 with a minimal amount of effort.

The pliable liner 28 may include the stiffening panel 30. The stiffening panel 30 may fit at the bottom of the liner and help hold the frame in the expanded configuration. When it is desired to alter the configuration of the frame from the expanded configuration to collapsed configuration, the stiffening panel 30 may be removed. When provided, the shelf 32 or lower container below the pliable liner 28 may be similarly configured. When it is desired to alter the configuration of the frame from the expanded configuration to collapsed configuration, the stiffening panel of the lower container or the shelf 32, as applicable, may be removed.

The wagon may also be provided with a cover that is configured to protect the wagon when the wagon is in its collapsed condition. The cover may also reduce the likelihood that things will get snagged on the wagon when the wagon is in storage. The cover may include a pocket for holding the stiffening panel 30, and the bottom shelf 32 or the lower container stiffening panel, when the wagon is in its collapsed condition. The stiffening panel on the pliable liner 28, and the lower container as applicable, may be comprised of four adjacent panels that are wrapped in fabric in a manner such that the stiffening panel can be folded like an accordion. When unfolded, the stiffening panel 42 can be placed in the bottom of the interior compartment of the wagon 20. The stiffing panel 30 helps distribute loads of any cargo being carried in the wagon 20 more evenly to the bottom support assembly 54 of the frame 22 and prevents the components of the bottom support assembly from being felt by children riding in wagon. The stiffening panel of the lower container and/or the shelf may be similarly constructed.

FIGS. 18-21 show an alternate embodiment of a wagon 120 utilizing a different configuration of folding bar assemblies 142 on the left and right sides of the wagon. The embodiment of the wagon in FIGS. 18-21 may include scissor bar assemblies 42 as previously described on the front and rear sides of the frame of the wagon. The embodiment of the wagon in FIGS. 18-21 may include a collapsible bottom support assembly 54 as previously described. The wagon of FIGS. 18-21 may include a tow handle 26, wheels 24, liner 28, shelf 32, and/or stiffening member(s) 30 as described previously.

Each of the left and right sides of the frame of the wagon of FIGS. 18-21 comprises a pair of folding bar assemblies 142 that include a pair of crossed bars 180,182 that are pivotally joined to each other, and a linkage 184. Each pair of crossed bars 180,182 of the folding bar assembly of the pair of folding bar assemblies of the left and right sides of the frame has left and right upper legs and left and right lower legs. Each pair of pivotally connected crossed bars of the folding bar assembly has a long bar 180 and a short bar 182. The long bar 180 of each pair of crossed bars in the folding bar assembly has an upper leg outer end 144 operatively coupled to the vertically oriented pole 40. As described previously, the connector 148 may be fixedly mounted on the top or distal end of the vertically oriented pole 40, and the upper leg outer end 144 of the long bar 180 of the crossed bars may be connected to the connector with a pivot pin. The opposite inner ends of the long bars 180 of the crossed bars of the pair of folding bar assemblies 142 may be pivotally connected together. That is, making reference to the orientation shown in FIG. 19, the right lower leg end of the long bar 180 of the crossed bars of the left folding bar assembly 142L is pivotally connected with the left lower leg end of the long bar 180 of the crossed bars of the right folding bar assembly 142R. The short bar 182 of each pair of crossed bars in the folding bar assembly 142 has a lower leg outer end 146 operatively coupled to the vertically oriented pole 40. As described previously, the sliding connector 150 may be arranged below the upper leg outer end 144 to slide on the vertically oriented pole 40. The opposite ends of the short bars of the pairs of pivotally connected crossed bars of the pair of folding bar assemblies may be pivotally connected with the respective linkage 184. That is, making reference to the orientation shown in FIG. 19, the right upper leg end of the short bar 182 of the crossed bars of the left folding bar assembly 142L is pivotally connected with linkage 184 of the left folding bar assembly, and the linkage 184 of the left folding bar assembly extends to the long bar 182 of the crossed bars of the right folding bar assembly 142R. Again, making reference to the orientation shown in FIG. 19, the left upper leg end of the short bar 182 of the crossed bars of the right folding bar assembly 142R is pivotally connected with linkage 184 of the right folding bar assembly, and the linkage 184 of the right folding bar assembly 142R extends to the long bar 180 of the crossed bars of the left folding bar assembly 142L.

When the wagon 120 of FIGS. 18-21 is in the expanded configuration, each of the lower leg outer ends 146 of the pairs of folding bar assemblies 142 has a first distance D1' to each of the corresponding upper leg outer ends 144 of the pairs of folding bar assemblies along the respective vertically oriented poles 40. The first distance D1' may be different for each upper leg and lower leg outer end but is generally preferably the same. As the wagon is altered from the wagon's expanded configuration to the wagon's collapsed configuration, the lower leg outer end 146 of each of the pair of folding bar assemblies 142 slides downward (and away) relative to the corresponding upper leg outer end 144 of the pairs of folding bar assemblies on the respective vertically oriented pole 140. So, when the wagon is in the collapsed configuration, each of the lower leg outer ends 146 of the pairs of folding bar assemblies 142 is at a second distance D2' to each of the corresponding upper leg outer end 144 of the pairs of folding bar assemblies along the respective vertically oriented poles. The second distance D2' may be different for each upper leg and lower leg outer end but is generally preferably the same. As the frame is altered from the expanded configuration to the collapsed configuration, the pairs of folding bar assemblies 142 increase in height and decrease in length. The second distance D2' of each of the respective upper and lower legs outer ends 144,146 is greater than the first distance D1' of each of the respective upper and lower legs outer ends. Similarly, as the wagon is altered from the wagon's collapsed configuration to the wagon's expanded configuration the lower leg outer end 146 of each of the pairs of folding bar assemblies 142 slides upward (and toward) relative to the corresponding upper leg outer end 146 of the pairs of folding bar assemblies on the respective vertically oriented pole 140. As the frame is altered from the collapsed configuration to the expanded configuration, the pairs of folding bar assemblies 142 decrease in height and increase in length. In view of the arrangement of the folding bar assemblies 142 on the sides of the frame, the sliding motion of each of the lower leg outer ends 146 on the vertically oriented pole 140, and the fixed positioning of each of the upper leg outer ends 144 on the vertically oriented pole, the frame has the same vertical height VH' when the wagon is in the collapsed configuration as when the wagon is the expanded configuration. And as described below in greater detail, the telescopically arranged tow handle 26 and downward motion of the connecting bars 60 from the tow handle to the frame also allows the wagon as a whole to have the same vertical height when the wagon is in the collapsed configuration as when the wagon is the expanded configuration.

Figure 22:
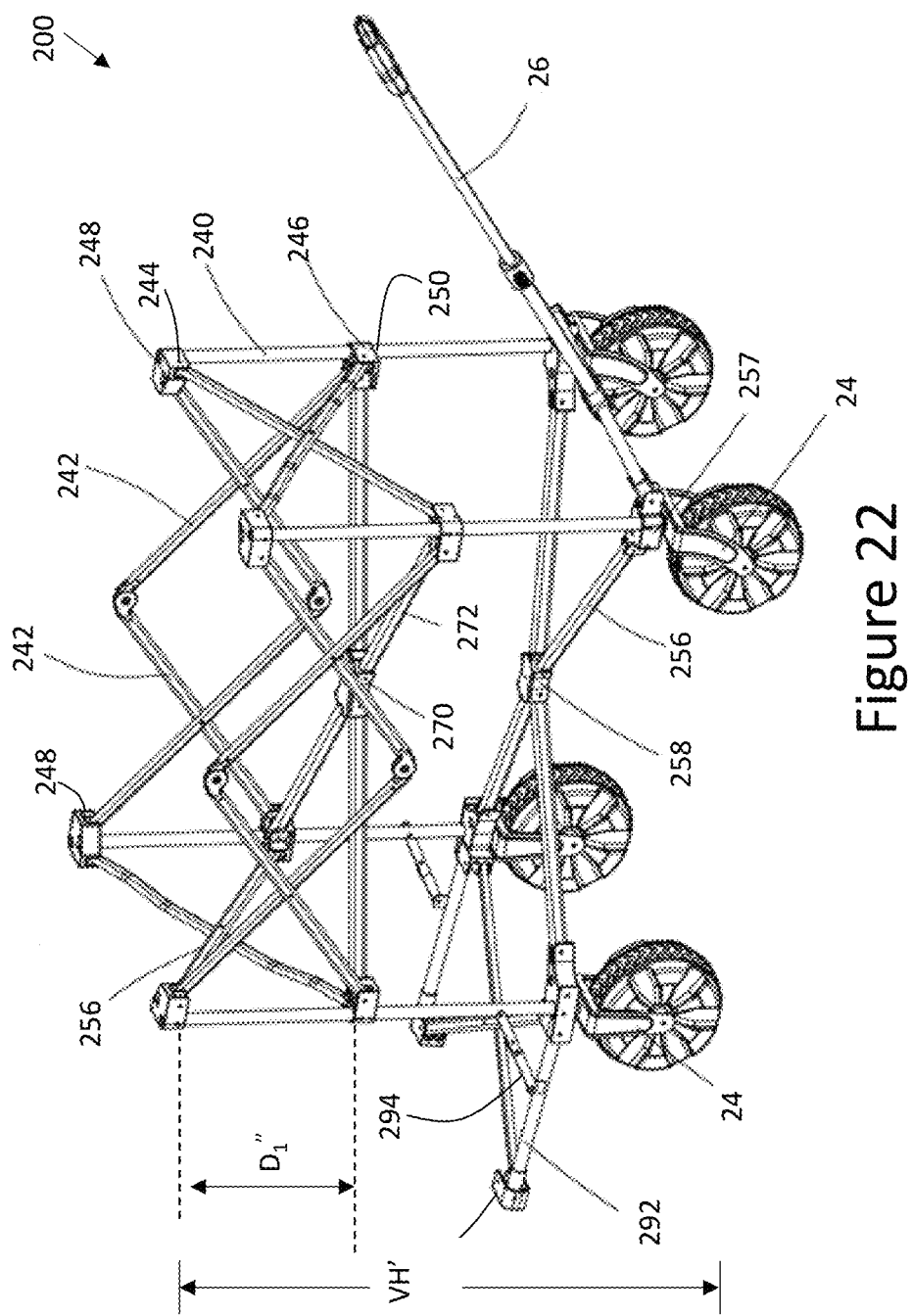
FIG. 22 is a perspective view of a frame of another embodiment of an exemplary wagon comprising a double-decker wagon in an expanded configuration.
Figure 23:
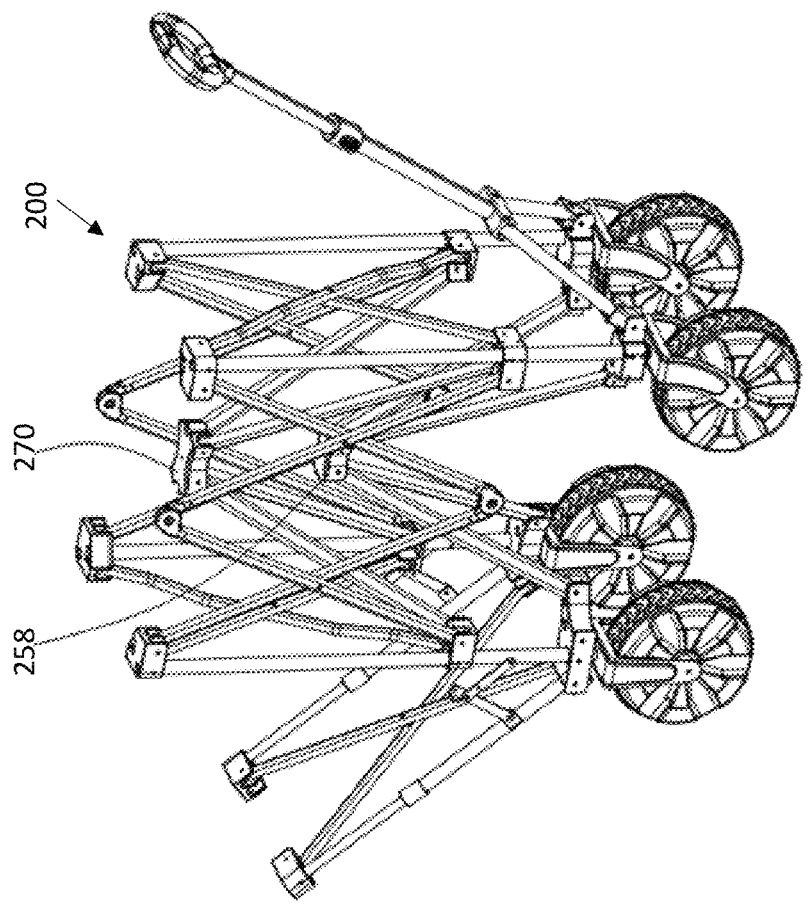
FIG. 23 is a perspective view of the double-decker wagon of FIG. 22 as it is being moved between an expanded configuration and a folded configuration.
Figure 24:
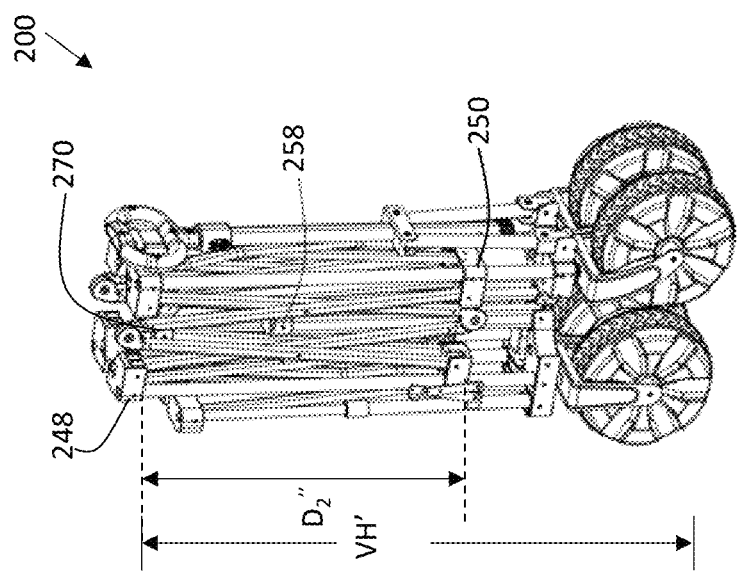
FIG. 24 is perspective view of the double-decker wagon of FIG. 22 in a folded configuration.

FIGS. 22-24 show another embodiment of a wagon comprising a foldable, double-decker wagon. As will become evident from the description that follows below, the double-decker wagon of FIGS. 22-24 is convenient to fold, has a large storage space, and is convenient to store and carry. The frame 200 of the wagon of FIGS. 22-24 shares many of the features of the wagons of FIGS. 1-21, but includes a double decker type support. Similar reference characters will be used to denote similar structures among the embodiments of the Figures. As shown in FIGS. 22-24, when folded, sliding members of the double-decker wagon slide, two decks of storage platforms are folded, and the double-decker wagon is finally folded into a bundle. The double-decker wagon is convenient to fold, has a large storage space, and is convenient to store and carry.

The exemplary double-decker wagon is provided with vertical members 240 arranged at four corners of a frame 200 of the wagon. Each of the vertical members 240 is provided with an upper bracket 248, a sliding member 246 and a lower bracket 257. The frame has first bottom members 272 with inner and outer ends. The inner ends of the first bottom members 272 are operatively pivotally connected to each other via a first bottom connecting member 270. The outer ends of the first bottom members 272 are operatively pivotally connected to the sliding member 250. When the frame 200 is in the expanded configuration, the sliding member 250 and the outer ends of the first bottom members 272 are generally in a middle region of the respective vertical member 240 at a first distance $D_1$" from the upper bracket 248. When the frame 200 is in the folded configuration, the sliding member 250 and the outer ends of the first bottom members 272 are generally toward a lower region of the respective vertical members 240 at a second distance $D_2$" from the upper bracket 248, which is greater than the first distance $D_1$". The frame 200 also includes second bottom members 256 with inner and outer ends. The inner ends of the second bottom members 256 are operatively pivotally connected to each other via a second bottom connecting member 258. Outer ends of the second bottom members 256 are operatively pivotally connected to the lower brackets 257 of each of the vertical members 240 at the bottom of the frame.

Preferably, the frame 200 includes folding assemblies 242 between the adjacent vertical members, which may be similar to the embodiments described previously. For instance, as shown in the drawing the folding members 242 may be arranged in the manner described previously in FIGS. 1-17. The folding assemblies 242 includes one or more crossed members. Preferably, the left and right sides of the frame include folding assemblies 242 with two sets of first and second cross members. On the side cross member folding assemblies 242, an outer end of each 244 first member of the side crossed members is preferably rotatably connected with the upper bracket 248, and an outer end of the second member 246 of the side crossed members is preferably rotatably connected with the sliding member 250. On the side cross member folding assemblies 242, an inner end of the first member of one of the side crossed member folding assemblies is connected with an inner end of the second member of the other of the side crossed member folding assemblies. Preferably, two sets of folding assemblies 242 are arranged between the adjacent vertical members 240 on the left and right sides of the frame 200, and preferably, one set of folding assemblies 242 is arranged between the adjacent vertical members 240 at the front and rear sides of the frame.

Preferably, a pull rod 26 is provided on the front side of the frame between the vertical members. The pull rod may be operatively pivotably connected with the vertical members.

Preferably, a folding tailgate 290 is provided on the rear side of the vertical members 240. Preferably, the folding tailgate 290 has members 292 that are operatively pivotally connected with the lower bracket 257 of the rear vertical members 240. Preferably, the folding tailgate 290 has over center linkages 294 that are operatively rotatably connected with the vertical members 240 and the tailgate members 292. The folding tailgate 290 is configured to provide an additional storage platform to store long items.

When the frame 200 of the double-decker wagon of FIGS. 22-24 is folded, the first bottom connecting member 270 is pulled upwards, so that the vertical members 240 approach each other while the sliding members 250 slide downward along the vertical members. The first bottom members 272 and the second bottom members 256 rotate, so that the first bottom members and the second bottom members are folded and contracted among and adjacent to the vertical members 240, thus allowing the frame 200 of the double-decker wagon to be folded into a bundle.

The frame 200 of the double decker wagon of FIGS. 22-24 includes at least two decks of storage platforms, that is, a middle deck and the lower deck, supported by the vertical members 240. The middle deck or storage platform comprises the first bottom members 272 and the first bottom connecting member 270. The first bottom members 272 are angled from the vertical members 240 toward the center of the wagon. The inner ends of each of the first bottom members 272 are operatively and rotatably connected with the first bottom connecting member 270, and the outer ends of the first bottom members 272 are operatively and rotatably connected with a respective sliding member 250. When the first bottom connecting member 270 is pulled upward for folding of the frame 200, the other components of the frame move inward accordingly along with the first bottom connecting member. The frame also includes a lower deck or storage platform that comprises the second bottom members 256 and the second bottom connecting member 258. The second bottom members 256 are angled from the vertical members 240 toward the center of the wagon. The inner ends of each of the second bottom members 256 are operatively and rotatably connected with the second bottom connecting member 258, and the outer ends of the second bottom members 256 are operatively and rotatably connected with the lower brackets 257 adjacent the bottom of the frame and the vertical member 240. In the embodiment of the double-decker wagon shown in FIGS. 22-24, there are two decks of storage platforms, which allow the user to store many articles. These articles can be classified and stored in the two decks. The lower storage platform can be folded synchronously and simultaneously with the middle storage platform.

When the first bottom connecting member 270 is pushed down and the vertical members 240 move away from each other, the components of the frame 200 extend accordingly outwards, and the two decks of storage platforms of the double-decker wagon are unfolded. The folding assembly(ies) 242 arranged between the adjacent vertical members 240 fold or unfold along with the movement of the vertical members 240. As mentioned above, the folding assembly(ies) 242 may include cross members which are intersected with each other and a first member and a second member of the crossed members which are rotatably connected at the center of the intersection with the first member rotatably connected with the upper bracket 248, and the second member is rotatably connected with the sliding member 250. Different sizes and different numbers of folding assemblies may be provided according to the length or width of the double-decker wagon to meet the folding effect of double-decker wagons of different sizes, for instance, as shown in the embodiment of the wagon in FIGS. 18-21.

It should be noted that, relational terms such as first and second are merely used to distinguish a member from another member and do not require or imply that there are any such actual relationships or sequences between the members. It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" or "region" should be construed as meaning some or all of the item or element that it qualifies. Moreover, use of identifiers such as top, bottom, front, back, left, right, inner, outer, first, second, and third should not be construed in a manner imposing any relative position or time sequence between limitations. Still further, the order in which the steps of any method claim that follows are presented should not be construed in a manner limiting the order in which such steps must be performed, unless such and order is inherent.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A foldable wagon comprising a frame, the frame adapted and configured to be moved between an expanded configuration and a folded configuration, the frame comprising vertical members arranged at four corners of the frame, each of the vertical members having an upper bracket on one end of the vertical member, a lower bracket on an opposite end of the vertical member, and a sliding member slidingly disposed on the vertical member between the upper and lower brackets, the frame further including first bottom members, each of the first bottom members having inner ends and opposite outer ends, the inner ends of the first bottom members being operatively and pivotally connected together with a first bottom connecting member, the outer ends of the first bottom members being operatively and pivotally connected to a respective sliding member, the frame further including second bottom members, each of the second bottom members having inner ends and opposite outer ends, the inner ends of the second bottom members being operatively and pivotally connected together with a second bottom connecting member, the outer ends of the second bottom members being operatively and pivotally connected to a respective lower bracket.

2. The wagon according to claim 1, wherein the frame includes at least one folding assembly between adjacent vertical members, the at least one folding assembly comprises crossed first and second members, the first member of the folding assembly is operatively and pivotally connected with a respective upper bracket, and a second member of the folding assembly is operatively and pivotally connected with a respective sliding member.

3. The wagon according to claim 2, wherein one folding assembly is arranged between the adjacent vertical members at front and rear sides of the frame.

4. The wagon according to claim 3, wherein two folding assemblies are arranged between the adjacent vertical members on the left and right sides of the frame.

5. The wagon according to claim 1, further comprising a pull rod, the pull rod being operatively and pivotally connected with the vertical members on a front side of the frame.

6. The wagon according to claim 1, further comprising a foldable tailgate, the tailgate being operatively and pivotally connected with the vertical members on a rear side of the frame.

7. A wagon that is adjustable between an expanded configuration and a collapsed configuration, the wagon comprising:

a frame, the frame having four sides, each side being formed by a pair of folding bar assemblies, the pair of folding bar assemblies of each side of the frame having opposite upper leg outer ends and opposite lower leg outer ends, the frame also having a vertically oriented pole at an intersection of the pair of folding bar assemblies of one side with the pair of folding bar assemblies of an adjacent transverse side, the upper leg outer end of each of the pair of folding bar assemblies being operatively connected to the vertically oriented pole, the lower leg outer end of each of the pair of folding bar assemblies being operatively slidingly connected to the vertically oriented pole, wherein when the wagon is in the expanded configuration, each of the lower leg outer ends of the pairs of folding bar assemblies has a first distance to each of the corresponding upper leg outer ends of the pairs of folding bar assemblies along the respective vertically oriented poles, wherein when the wagon is in the collapsed configuration, each of the lower leg outer ends of the pairs of folding bar assemblies has a second distance to each of the corresponding upper leg outer end of the pairs of folding bar assemblies along the respective vertically oriented poles, the second distance of each of the respective upper and lower legs outer ends is greater than the first distance of each of the respective upper and lower legs outer ends, the frame further comprising a collapsible bottom support assembly, the bottom support assembly comprising a central hub and four bars, the four bars are each operatively pivotally connected to the central hub and operatively pivotally connected to the bottom end portion of a respective one of the vertically oriented poles, the frame further comprising a collapsible upper support assembly, the upper support assembly comprising a central hub and four bars, the four bars are each operatively pivotally connected to the central hub and operatively pivotally and slidingly connected to a respective one of the vertically oriented poles.

8. The wagon according to claim 7 wherein each folding bar assembly in the pair of folding bar assemblies comprises a single pair of crossed bars pivotally connected to each other.

9. The wagon according to claim 7, wherein one folding assembly is arranged between the adjacent vertically oriented poles at front and rear sides of the frame.

10. The wagon according to claim 7, further comprising a pull rod, the pull rod being operatively and pivotally connected with the vertically oriented poles on a front side of the frame.

11. The wagon according to claim 7, further comprising a foldable tailgate, the tailgate being operatively and pivotally connected with the vertically oriented poles on a rear side of the frame.

12. A wagon that is adjustable between an expanded configuration and a collapsed configuration, the wagon comprising:
a frame, the frame having four sides, each side being formed by a pair of folding bar assemblies, the pair of folding bar assemblies of each side of the frame having opposite upper leg outer ends and opposite lower leg outer ends, the frame also having a vertically oriented pole at an intersection of the pair of folding bar assemblies of one side with the pair of folding bar assemblies of an adjacent transverse side, the upper leg outer end of each of the pair of folding bar assemblies being operatively connected to the vertically oriented pole, the lower leg outer end of each of the pair of folding bar assemblies being operatively slidingly connected to the vertically oriented pole, the frame being configured and adapted such that as the wagon is altered from the wagon's expanded configuration to the wagon's collapsed configuration, the lower leg outer end of each of the pair of folding bar assembly slides downward relative to the corresponding upper leg outer end of the pairs of folding bar assemblies on the respective vertically oriented pole, and the pairs of folding bar assemblies increase in height and decrease in length, the frame being configured and adapted such that as the wagon is altered from the wagon's collapsed configuration to the wagon's expanded configuration the lower leg outer end of each of the pair of folding bar assembly slides upward relative to the corresponding upper leg outer end of the pairs of folding bar assemblies on the respective vertically oriented pole, and the pairs of folding bar assemblies decrease in height and increase in length; the frame further comprising a collapsible bottom support assembly, the bottom support assembly comprising a central hub and four bars, the four bars are each operatively pivotally connected to the central hub and operatively pivotally connected to the bottom end portion of a respective one of the vertically oriented poles, the frame further comprising a collapsible upper support assembly, the upper support assembly comprising a central hub and four bars, the four bars are each operatively pivotally connected to the central hub and operatively pivotally and slidingly connected to a respective one of the vertically oriented poles.

13. The wagon according to claim 12 wherein each folding bar assembly in the pair of folding bar assemblies comprises a single pair of crossed bars pivotally connected to each other.

14. The wagon according to claim 12, wherein one folding assembly is arranged between the adjacent vertically oriented poles at front and rear sides of the frame.

15. The wagon according to claim 12, further comprising a pull rod, the pull rod being operatively and pivotally connected with the vertically oriented poles on a front side of the frame.

16. The wagon according to claim 12, further comprising a foldable tailgate, the tailgate being operatively and pivotally connected with the vertically oriented poles on a rear side of the frame.

17. The wagon according to claim 15 wherein the pull rod is telescopically collapsible.

18. The wagon according to claim 12 wherein the central hub of the bottom support assembly allows each of the four bars of the bottom support assembly to pivot downward therefrom and prevents the four bars from pivoting upward therefrom beyond horizontal.

19. The wagon according to claim 12 wherein the central hub of the upper support assembly allows each of the four bars of the upper support assembly to pivot downward therefrom and prevents the four bars from pivoting upward therefrom beyond horizontal.

20. The wagon according to claim 12 wherein the frame has a same vertical height when the wagon is in the collapsed configuration as when the wagon is the expanded configuration.

\* \* \* \* \*